United States Patent [19]

Crump, Jr.

[11] 4,186,296

[45] Jan. 29, 1980

[54] VEHICLE ENERGY CONSERVATION INDICATING DEVICE AND PROCESS FOR USE

[76] Inventor: John M. Crump, Jr., 1018 Parkridge Cir. West, Jacksonville, Fla. 32211

[21] Appl. No.: 861,965

[22] Filed: Dec. 19, 1977

[51] Int. Cl.² .................. G01M 15/00; G06G 1/14
[52] U.S. Cl. ................................... 235/61 J; 73/114
[58] Field of Search .............. 235/61 J, 61 B; 73/114; 364/442

[56] References Cited

U.S. PATENT DOCUMENTS

| | | | |
|---|---|---|---|
| 1,433,310 | 10/1922 | Stuber | 235/61 J |
| 1,660,641 | 2/1928 | Banning, Jr. | 73/114 |
| 2,268,549 | 1/1942 | Kennedy | 235/61 J |
| 2,661,900 | 12/1953 | Pastorius | 235/61 J |
| 2,724,552 | 11/1955 | Sherwood | 235/61 J |
| 2,926,843 | 3/1960 | Francis et al. | 235/61 B |
| 3,030,804 | 4/1962 | Riegger | 73/114 |
| 3,908,451 | 9/1975 | Walker et al. | 364/442 |
| 3,927,305 | 12/1975 | Gruhl | 235/61 J |

Primary Examiner—Stephen J. Tomsky

[57] ABSTRACT

A vehicle energy conservation indicating device comprising an integrated instrument cluster functioning basically as a nomographic computing mechanism. The odometer distance traveled indicator computing mechanism is linked with the fuel indicating gauge mechanism such that a three variable equation computing mechanism is obtained. The three variables are distance traveled, quantity of fuel consumed and distance traveled per unit of fuel consumed. Energy conservation is achieved by operating the vehicle under such performance conditions as to produce the highest possible value for distance traveled per unit of fuel consumed. The instrument panel cluster brings the operator's attention to focus upon and continuously stimulated to conserving energy. Furthermore, the vehicle energy conservation indicating device can be adapted for recording these performance variables on tape type print out. The speedometer advises the vehicle operator when he is obeying or breaking the speed laws which are enforced and monitored by the police with specific punishment prescribed for violations of the law. At ths time there is no comparable procedure for enforcing vehicle energy conservation. Thus, this direct read out of distance traveled per unit of energy will moderate the operation in an analogous manner similar to subliminal advertising. This device becomes the focal point of the instrument panel along with the speedometer, thereby providing constant motivation to obey both the speed and energy conservation laws.

13 Claims, 11 Drawing Figures

VEHICLE ENERGY CONSERVATION INDICATING DEVICE AND PROCESS FOR USE

BACKGROUND OF THE INVENTION

On Wednesday night, Apr. 20, 1977, President Carter asked the United States Congress to approve a national energy policy, HR 6831, that raises prices and taxes for energy and automobiles to encourage conservation of vanishing energy resources. In 1975 the Energy Research and Development Administration was established with the mission, among other items, of more efficient use of both existing and new sources of energy in industry and transportation. At present about one fourth of all energy consumed in the United States is used in the transportation of people and goods.

In order to achieve energy conservation in the transportation field it is, among other things, absolutly essential that the vehicle operator know how his vehicle is performing. The following related facts are of interest in terms of the potential amount of energy to be conserved:

Each year americans drive approximately 800 billion miles, consuming some ninety billion gallons of fuel. Cars are driven an average of 10,000 miles per year.

Performance characteristics are a function of many variables such as vehicle body aerodynamics, engine combustion air/fuel ratio, ignition timing, valve action, ignition coil, ingition condenser, distributor, spark plugs, accesories such as power brakes and air conditioning, transmission gear ratios, tire inflation pressure, fuel quality, road conditions, environmental conditions, and last but not least the "Vehicle Operator".

Fuel economy testing procedures have been established by the Society of Automotive Engineers recommended practice, SAE J1082. This testing procedure provides a uniform standardized testing procedure. The many factors affecting performance are carefully incorporated into this comprehensive fuel economy testing procedure. Considerable skill is required to understand and/or conduct repairs and adjustments to the related engine components to achieve optimum fuel economy. The owner/operator must perform planned maintenance to maintain the vehicle in optimum performance and operating condition.

The key link between vehicle performance and energy conservation is the operator. In order to conserve energy the operator needs to know how his vehicle is performing, both in response to his driving habits and engine operation. If the vehicle specific label, required by Federal Law, states that the vehicle is to obtain 30 miles per gallon for highway driving and the actual observed performance is not within say ten percent of this value, then the operator needs to be aware of this low performance and take corrective action. Without a vehicle energy conservation indicating device it is estimated that at any given time some 75 percent of all vehicles will be operating more than 10 percent below rated top performance and furthermore the operator will not be aware of this condition. The analogous situation is comparable with having a speed limit law but no speedometer to tell the operator the vehicle speed. The energy conservation indicating device will cause the vehicle operator to be continuously aware of vehicle performance thereby motivating prompt corrective maintenance to conserse both energy and economics.

Of corollary interest are several allied regulations relating to vehicle sales and ownership. First, new vehicle dealers are required by Federal Law to affix a manufacturer's sales label onto the vehicle including, among other items, the vehicle rated city and highway fuel economy. These ratings are based on the results of tests conducted or certified by the Environmental Protection Agency and are typical gas mileage estimates. The actual fuel economy of the vehicle will vary depending on the type of driving, driving habits, how well the vehicle is maintained, optional equipment installed, and road and weather conditions. The energy conservation indicating device, of the present invention, will continuously inform the operator of the observed economy relative to rated economy. Secondly, under the United States Clean Air Act, any franchised new vehicle dealer setting idle mixtures to anything other than the manufacturer's specifications on either new or sold vehicles could subject that dealer to a maximum fine of $10,000 for each offense. In addition, several states have legislated the right to prosecute any *individual* who misadjusts a vehicle, conviction of which could result in further punitive action. Thirdly, federal regulations require an odometer mileage statement upon transfer of vehicle ownership. An inaccurate statement could make the indiviual liable for damages to the transferee, pursuant to paragraph 409(A) of the motor vehicle information and cost savings act of 1972, public law 92-513. Furthermore, these statements are retained in the permanent dealer file. Fourth, and finally, the typical vehicle warranty goes to great length to emphasize the owner's responsibility for proper maintenance service.

With the energy conservation indicating device, subject of the present invention, a means is provided whereby the odometer mileage statement could be revised to include not only mileage but fuel consumed and average fuel economy.

OBJECTS AND SUMMARY OF THE INVENTION

It is, therefore, an object of this invention to provide a vehicle energy conservation indicating device that is the focus of operator attention along with the speedometer. According to a preferred embodiment of present invention the three primary vehicle indicating instruments, (1) speedometer, (2) odometer, and (3) fuel gauge, are integrated into a functional computing mechanism that solves the three variable equations: distance traveled per unit of fuel consumed equals distance traveled divided by units of fuel consumed. These units are customarily given such that the results are read in miles per gallon.

It is still another object of this invention to provide a vehicle energy conservation indicating device that can be adapted for permanent record type read out of distance traveled per unit of fuel consumed.

It is also an objective of this invention to provide a device which is adaptable to the standard odometer input terminal and the standard fuel gauge input terminal. Input terminal being defined as those elements that by their motions represent the variables involved in the computation of the desired output terminal, namely the distance traveled per unit of fuel consumed.

It is also an objective of this invention to provide a device whereby the odometer registers both trip distance and total distance with trip distance being resettable. Furthermore, it is adaptable for registering fuel consumed per trip and also total fuel consumed over the life of the vehicle.

The environmental Protection Agency's fuel economy ratings, posted on new vehicle window sales data sheets, are compiled from controlled testing procedures. These ratings can be used to compare one brand of vehicle with another during the initial purchasing process and can be used thereafter as a reference point for expected vehicle performance. Actually, performance depends on many variables, the two most important of which are vehicle maintenance and operator driving habits. An owner has control over these variables to an extent whereby actual observed vehicle fuel consumption performance can be continuously compared with the EPA rated reference point. This invention provides a means whereby the vehicle operator can so monitor the vehicle fuel consumption performance.

DESCRIPTION OF PREFERRED EMBODIMENTS CONTEMPLATED

An embodiment of the vehicle energy conservation indicating device comprising an integrated instrument cluster functioning basically as a nomographic computing mechanism is illustrated in FIGS. 1 through 11 of the drawings. For purposes of clarity and ease of description the overall construction in a typical illustration will be described, then the particular subassemblies involved with the embodiment of modified techniques of utilization, including certain necessary particulars of various elements thereof, and finally followed by a description of the preferred embodiment for vehicular utilization.

Figure 1:
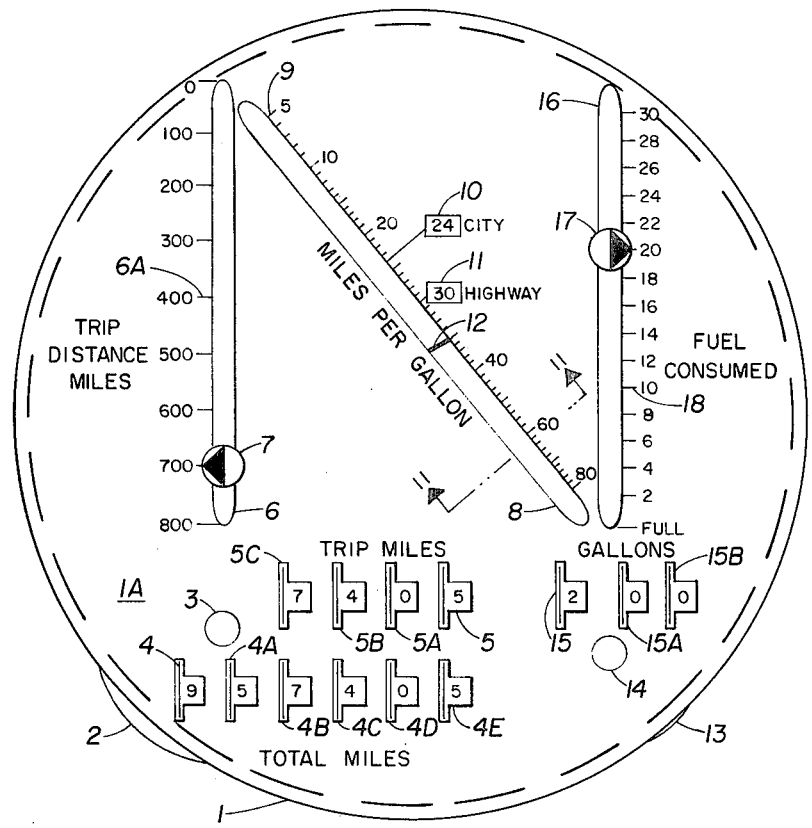
FIG. 1 is a front plan view of a preferred embodiment of the energy conservation indicating device showing the principles of the present invention as viewed by the vehicle operator.

Referring now to FIG. 1, a preferred embodiment of the present invention, herein disclosed by way of illustration, is in the nature of an integrated instrument cluster 1 with vehicle energy conservation being measured along the diagonal scale 8 by indexable pointer means 12. Energy conservation indication is a function of vehicle performance, and is indicated as distance traveled per unit of fuel consumed, being illustrated hereon as miles per gallon. Basically this instrument is used to solve the three variable equation where performance efficiency equals useful work performed divided by fuel consumed. In the illustration the equation is miles per gallon equals miles divided by gallons. Vertical scale 6A indicates distance traveled by indicator pointer 7. Vertical scale 18 indicates fuel consumed by indicator pointer 17. Fuel economy ratings, required by law to be posted on vehicle window labels, are also appropriately displayed on the energy conservation indicator device generally at 10 for city driving and 11 for highway driving. Thus the integrated instrument cluster 1 brings the operator's attention to focus upon the ultimate results of all related variables which influence vehicle performance and hence energy conservation is achieved by keeping the operator advised as to the actual observed economy performance indicated by indexable pointer means 12 relative to the rated performance indicated at 10 and 11.

Figure 2:
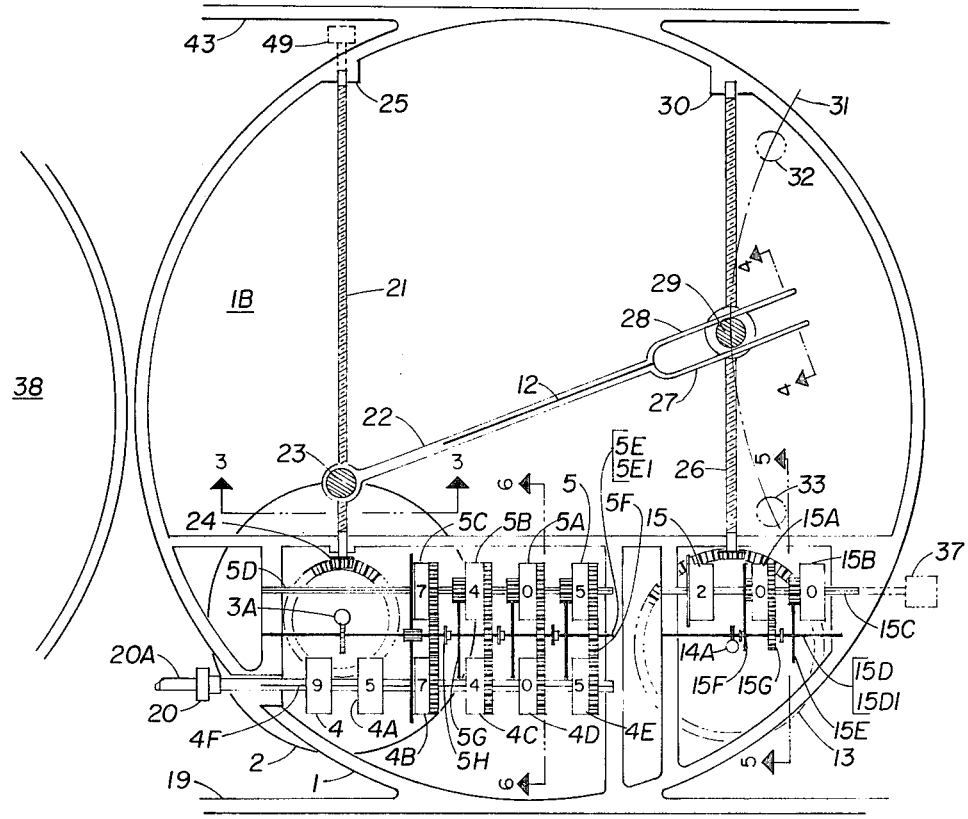
FIG. 2 is a base plan view showing the integrated instrument cluster functioning basically as a computing and recording mechanism when the odometer is operably interengaged with the fuel indicating measuring device.

In FIG. 2, alignment member 22 is connected to distance traveled measuring device 21 through pivotally mounting means 23. At the opposite terminus alignment member 22 is operably connected to fuel consumed measuring device 26 through pivotally mounting means 29. Alignment member 22 has two pivotal axes, one about the geometric center of 23 and the other about the geometric center of 29 with the straight line intersecting these two pivotal points collinear with fuel economy indicating pointer means 12. Fuel economy indicating pointer means 12 can be color, and otherwise, coded for contrast with distance traveled per unit of fuel scale 9, shown in FIG. 1. To avoid complications resulting from relative degree of accuracy between vehicle rated economy and observed economy on the scale 9 the indicator pointer 12 can be given a suitable width which will allow for reasonably accurate observations to be made of vehicle observed economy relative to rated economy. Alignment member 22 comprises the fundamental synthesizing element.

Figure 3:
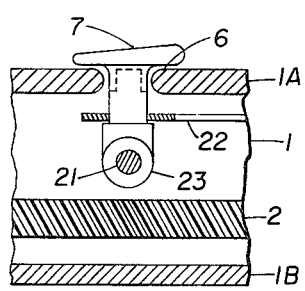
FIG. 3 is a fragmentary sectional view looking in the direction of the arrows 3—3 in FIG. 2 and more clearly illustrating pivotally mounting means for the computer alignment member.

Referring to FIG. 3, body member surface 1A has an aperture 6 through which pivotally mounting means 23 interengages indicator pointer 7 and alignment member 22. Pivotally mounting means 23 is operably connected to distance traveled measuring device 21.

Figure 4:
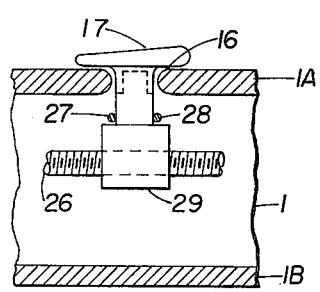
FIG. 4 is a fragmentary sectional view looking in the direction of the arrows 4—4 in FIG. 2 and more clearly illustrating the fuel consumed measuring device pivotally mounted to the computer alignment member.

As illustrated in FIG. 4, body member surface 1A has an aperture 16 through which pivotally mounting means 29 interengages indicator pointer 17 and alignment member guides 27 and 28. Pivotally mounting means 29 is operably connected to fuel consumed measuring device 26.

Figure 9:
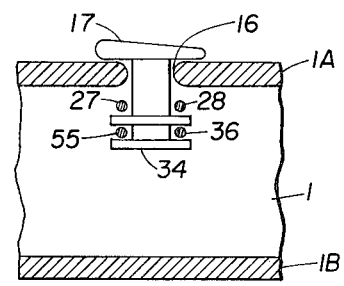
FIG. 9 is a fragmentary sectional view looking in the same direction of arrows 4—4 in FIG. 2 to illustrate a modified arrangement whereby the fuel gauge indicator arm is pivotally engaged with the computer alignment member.
Figure 10:
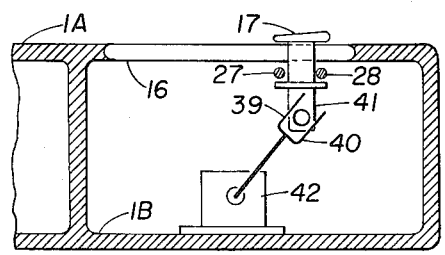
FIG. 10 is a fragmentary sectional view looking generally in the same direction of arrows 4—4 in FIG. 2 to illustrate another modified arrangement whereby the fuel gauge is engaged with the computer alignment member.

When utilized with a vehicle integrated instrument cluster fuel consumed measuring device 26 is operably interconnected with the fuel gauge indicator guide arms 55 and 36 as shown in FIG. 9 having a translating path 31 generally as described by the arc intersecting locations 32 and 33 as shown in FIG. 2. FIG. 10 illustrates a fuel instrument drive means 42 operably interengaged with modified pivotal mounting means 41 through fuel instrument indicator guide arms 39 and 40. Furthermore, it will be observed that FIG. 10 illustrates that indicator pointer 17, alignment member guide arms 27 and 28, and fuel instrument guide arms 39 and 40 are operable interengaged through modified pivotal mounting means 41. Said fuel gauge drive means 42 is generally of the electrical, electronic or electromechanical type since the actuating signal for the fuel consumed indicator pointer 17 is generally located remotely either at the fuel tank (not shown) or at a fuel flow measuring device (not shown). Observe in FIG. 9 that indicator pointer 17, alignment member guides 27 and 28 and fuel instrument guide arms 55 and 36 are operably interengaged through modified pivotal mounting means 34.

In constructing the vehicle energy conservation indicating device the following symbols are used in the calculations:

UWP = Useful work performed, generally measured in units of distance traveled miles but could be tons, pounds, hours or any other applicable unit of measurement.

FC = Fuel consumed, generally measured in units of gallons.

DPG = Performance efficiency and is in units of useful work performed per unit of fuel consumed, generally measured in miles per gallon. However, this could obviously be hours of operation per unit of fuel, tons of material moved per unit of fuel, pounds of product handled per unit of fuel or any corresponding suitable performance efficiency units applicable to the application under consideration.

The mathematical formula for performance efficiency that relates the three variable is given below:

$$DPG = UWP/FC$$

Although the energy conservation indicating device of the present invention has been illustrated and described herein for use in vehicular application, it is evident from the broader standpoint that the purpose of the device is for indicating performance whether on a road vehicle or a fixed industrial application such as cranes and bulk handling systems where the performance is measured in tons of product per unit of fuel rather than distance traveled. It should be understood, therefore, that it is not intended to limit the principles of the present invention to road vehicular applications alone, but rather energy conservation indicating devices according to the principles of the present invention may be installed or utilized in conjunction with various other purposes all of which are fully contemplated according to the present invention. Furthermore, the device may be made up in the form of a hand held computing device generally as shown in FIG. 1, or if desired, may be made to constitute an appurtenance of a vehicle or other fuel consuming machines generally as shown in FIG. 2.

For illustrative purposes the scales 6A, 9 and 18 shown on FIG. 1 have units corresponding to those generally applicable to a road vehicle. Distance traveled scale 6A would generally be calibrated from zero to a total distance correlating to the maximum trip distance available from the consumption of a complete tank of fuel. Thus fuel consumed scale 18 would also be calibrated for the vehicle or specific application. The calibration of distance traveled per unit of fuel scale 9 is uniquely established by the mathematical relationship shown in the performance efficiency formula defined herein before as DPG = UWP/FC.

Figure 5:
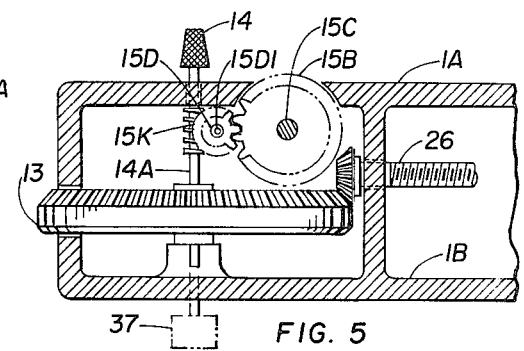
FIG. 5 is a fragmentary sectional view looking in the direction of arrows 5—5 in FIG. 2 and more clearly showing the fuel consumption counter recorder mechanism.
Figure 6:
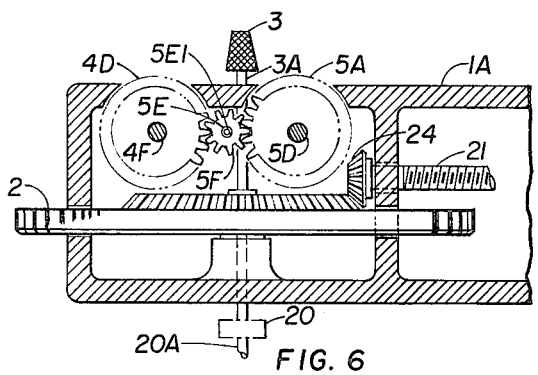
FIG. 6 is a fragmentary sectional view looking in the direction of arrows 6—6 in FIG. 2 to more clearly illustrate the distance traveled counter recorder mechanism.
Figure 8:
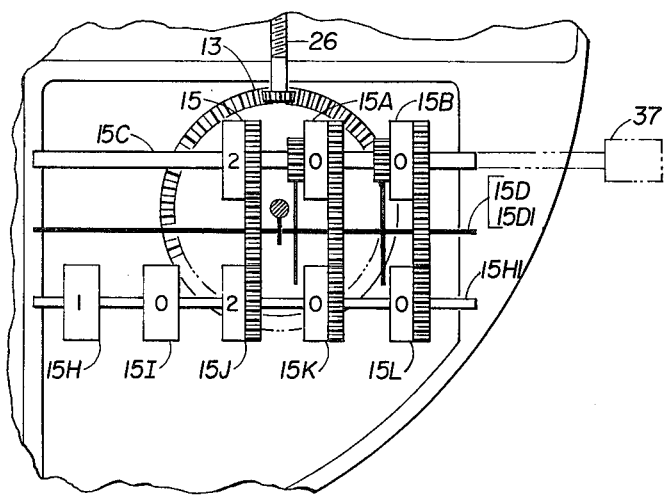
FIG. 8 is a partial base plan illustrating the fuel consumed recorder numeral wheels and related transmitting elements interengaged with computer fuel consumed measuring means and reset means.

Referring to the drawings and more particularly to FIGS. 1, 2, 5 and 6, and as discussed briefly before, the embodiment of the vehicle energy conservation indicating device described and illustrated in particularly suited and adaptable for an integrated vehicle instrument cluster. However, the entire device may be used as a computing mechanism as illustrated in FIG. 1 and stored in the conventional glove compartment. Also, observe in FIG. 2 that the vehicle speedometer cable 20A can be connected to the numerical counter wheel shaft 4F at speedometer cable connector means 20. Thus, the energy conservation indicating device may be utilized in one of three ways; as a computing mechanism illustrated in FIG. 1, as an integral part of the vehicle integrated instrument cluster, illustrated in FIG. 2, or as a vehicle appurtenance illustrated in FIG. 1 modified as illustrated in FIG. 6 and FIG. 8 for connections to distance traveled drive shaft 20A and fuel consumed drive means 37. These modifications and arrangements make the device adaptable for older vehicles and other special applications. The preferred embodiment is in the integrated instrument cluster 1 forming an integral part of both the vehicle instrument panel 43 and the operator's visual focus point serving as a permanent and continuous indication of vehicle performance. The subliminal implications are analagous to vehicle speed: you do not check the vehicle speed once a year to determine if the speed laws have been broken. Furthermore, vehicle performance is a function of vehicle maintenance and operator driving habits both of which the operator has within his control for corrective action providing the operator is aware of the necessity for said corrective action.

Important to the integrated instrument cluster 1, functioning basically as a nomographic computing mechanism, is the visual indication and storage of numerical data. FIGS. 1 and 2 show a trip miles counter comprising numeral wheels 5, 5A, 5B, 5C and reset means 2 and 3. Total miles is recorded by numeral wheels 4, 4A, 4B, 4C, 4D and 4E. The construction of the trip and total miles counter device does not in itself form a part of the present invention except in relation to the means for integrating it into the energy conservation indicating device. The conventional speedometer instrument 38 may be interconnected to the total miles counter shaft 4F by speedometer cable connector means 20. The series of numeral wheels 4 thru 4E mounted in series on shaft 4F and numeral wheels 5 thru 5C mounted in series on shaft 5D can be operated in a plurality of conventionally established arrangements normally associated with odometers having resettable trip indicators. As illustrated in FIG. 2 each counting device is provided with a plurality of counting transmitting elements 5F, 5G, 15E, 15F and 15G with meshing clutch elements similar to 5H thereby providing for trip reset without disturbing the totaling measurement counter numeral wheels 4 thru 4E in FIG. 2 and 15H thru 15L in FIGS. 7 and 8. Generally shafts 5E and 15D are each comprised of two shafts with one internal to the other; as illustrated in FIG. 5 shaft 15D1 is internal to shaft 15D, and in FIG. 6 shaft 5E1 is internal to shaft 5E.

The combined inter-relationship between the aforesaid elements provides the basic characteristics necessary for tens transfer and resetting to zero while simultaneously maintaining the totalized distance traveled. Referring to one embodiment, as illustrated in FIG. 2, it will be observed that drive shaft 20A drives the lowest order digit numeral counting wheel 4E by direct drive shaft 4F. Higher order digit numeral counting wheels 4, 4A, 4B, 4C and 4D are supported on shaft 4F without being operatively connected thereto. Drive input to successive higher order digit counting wheels is accomplished by means of the intermediate transmitting elements similar to 5F and 5G. Simultaneous with the accumulation of discrete data counts on the total miles counting elements of shaft 4F the trip miles discrete data is being accumulated on trip miles counting elements of shaft 5D. Intermediate transfer element 5F supported on shaft 5E drives numeral counting wheel 5 which in turn drives 5A through intermediate elements similar to 5G, 5H and 5F. Elements 5H are one way clutches which provide means for resetting trip miles to zero. Elements 5G are intermediate transfer means whereby the continuous analog accumulation of distance traveled input data is transferred from numeral wheel 5 to the remaining higher order numeral wheels both trip and total miles, while simultaneously driving shaft 3A thereby transmitting analog data to distance traveled measuring device 21. Higher order transfer between numeral wheels 4B, 4A and 4 is accomplished with conventional interrupted gear transfer (not shown) or geneva transfer mechanisms (not shown).

Reset of the trip miles counter elements to zero is accomplished by means of reset means 2 or 3 shown in FIGS. 1 and 6. Referring to FIG. 6 observe that reset means 2 & 3 are operatively connected to shaft 3A. Referring now to FIG. 2 it is shown that 3A is engaged with shaft 5E thereby driving intermediate elements similar to 5F through one way clutches similar to 5H. One form of conventional reset commonly used consists of a two piece counting wheel construction (not shown). A pinion attached to the shell of the wheel which contains the visible figures and is integral with the locking disk and transfer tooth action is picked up by rotary motion of the main counter shaft 5D being driven through counter wheel 5C which contains a spline. Sufficient rotational force of the shaft 5D overrides the spring detented coupling between the sections of the wheel allowing the wheel shell and its attached locking ring to rotate to zero position without disturbing the position of the total miles counter.

The aforedescribed internal details of one type of conventional resettable numeral wheel have not been shown but are described in order to complete the description. The significant characteristic to be observed is that the distance traveled input data is continuous analog with discrete readout on numeral wheels whereby the entire counting mechanism assembly including both total and trip miles accumulated data continuously without interruption. Simultaneous with this accumulation, a distance traveled measuring means 21 positions a vehicle performance indexable pointer means 12 in relative position to miles per gallon scale 9 as shown in FIG. 1.

For illustration, the numeral wheels 4E would be operably connected to the speedometer drive shaft 20A with numeral wheels 4 thru 4D being supported on shaft 4F and held in operable relationship by interposed counting pinions which provide the conventional counting means. Numeral wheel 4E is suitably and operationally connected to trip indicator numeral wheel 5 thereby transmitting the distance measurement to the series of numeral wheels 5A thru 5C. Intermediate shaft 5E serves two functions in this illustration. First it serves to support the intermediate elements between the two sets of numeral wheels on different shafts and secondly it serves as the input drive operational means for transmitting distance traveled to the distance traveled measuring device 21 through intermediate transmitting means 3A and 24. Employing the conventional techniques of odometers, and counting devices in general, reset means 2 or 3 are utilized for resetting the trip miles indicator 5 through 5C during fuel tank fill up operations.

Observe in FIGS. 5 and 6 that numeral wheels 4D, 5A and 15B are disposed such that their top sectors project above body member top surface 1A. When utilized as a manual computer mechanism the numeral wheels associated with trips, specifically numeral wheels 5 through 5C and 15 through 15B, may be individually operable registered thereby transmitting trip measurements both to the alignment member 22 and the totalizing recording counter numeral wheels. As illustrated in FIG. 6 the speedometer cable 20A may be operably connected to shaft 3A thereby transmitting distance measurement through transmitting means 24.

It is important to observe that when the energy conservation indicating device is utilized in the integrated instrument cluster incorporating fuel counter drive means 37, as illustrated in FIGS. 2, 5 and 8, that fuel counter drive means 37 drives numeral wheel 15B through shaft 15C which in turn drives higher order numeral wheels 15A and 15 through intermediate drive train means comprised of elements 15E, 15G and 15F. Numeral wheel 15B is keyed to shaft 15C. Numeral wheels 15A and 15 are supported, free turning on shaft 15C. Wheel 15B drives wheel 15A through intermediate drive means 15E and 15G. Numeral wheel 15A drives numeral wheel 15 by means of interrupted gear transfer (not shown). Shaft 14A is driven through drive means 15D to give a continuous analog indication of fuel consumed at fuel consumed measuring means 26 which positions indexable pointer means 12 in relative position to miles per gallon scale 9 as shown in FIG. 1. The indicator pointers 7 and 17 are reset when the fuel tank is refilled. When the indicator pointer 17 indicates full reset means 49 is energized thereby resetting indicator pointer 7 to zero trip miles. For illustration, fuel counter drive means 37 may be an electromechanical device operated by an electrical signal (not shown) from a sensing device at a remote fuel tank (not shown) or remote fuel metering device (not shown) such that when the fuel tank is filled the fuel drive means 37 and automatic reset means 49 are interlocked electrically (not shown) to drive measuring means 26 and 21 to their respective zero positions.

For illustrative purposes, FIGS. 1 and 2 show a fuel consumed gallons counter having numeral wheels 15, 15A and 15B rotatably mounted on shaft 15C with numeral wheels 15A and 15B operably connected to intermediate shaft 15D. Shaft 15D is supported by internal shaft 15D1 and serves two functions. First it serves to support the register element numeral wheels 15E, 15F and 15G and secondly it serves to transmit fuel consumed measurement to reset means shaft 14A and fuel consumed measuring device 26. The construction of the fuel consumed counter device does not in itself form a part of the present invention except in relation to the means for interconnecting it with the fuel consumed measuring device 26 and fuel consumed scale 18. Recording counter devices are conventionally constructed in a variety of forms including mechanical, electronic and electromechanical, each of which may be operably interengaged with the present invention.

Figure 7:
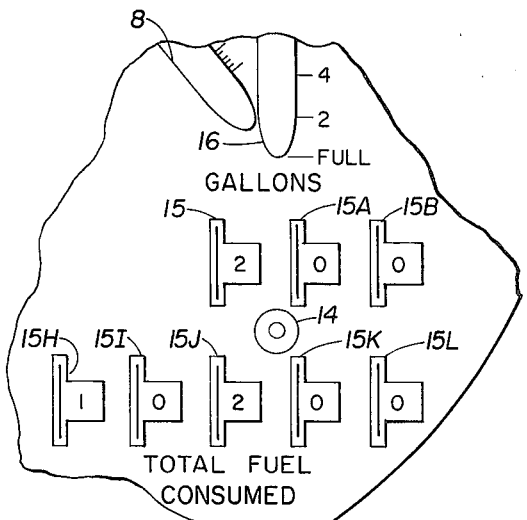
FIG. 7 is a partial front plan illustrating the fuel consumed totalizer recorder.

FIGS. 1 and 2 illustrate fuel consumed counting means for trip only and not with totalizing fuel consumed counting means as provided for in FIGS. 7 and 8. The fundamental basic characteristics of the fuel consumed counting means of FIGS. 7 and 8, and generally for FIGS. 1 and 2, employ the features described heretobefore for the distance traveled counting means. However, to further amplify the inter-relationship between the tens transfer means, clutches and reset means, the following description is presented. Observe that it is desired to measure fuel consumed in a continuous analog manner by fuel consumed measuring element 26. This is accomplished by driving shaft 14A through intermediate shaft 15D from intermediate drive means on the side of numeral wheel 15B. Tens transfer from the lowest driven wheel may be accomplished either with conventional interrupted gear or pinion to avoid ambiguity of reading the visible digits or the tens transfer may be accomplished in a continuous analog manner employing the intermediate direct drive means 15E, 15F and 15G (shown in FIG. 2) and illustrated in FIG. 8. Thus fuel consumed drive means 37 drives fuel consumed measuring means 26 in a continuous analog manner while numeral wheels associated with trip and total fuel consumed may be optionally driven by continuous analog or in the conventional interrupted gear or pinion transfer manner. In either condition it is important that the drive train be provided with one way clutches and appropriate conventional numeral wheels having, for illustration, pawl and spline reset capability (not shown). Therefore, trip counter wheels 15, 15A and 15B may be reset to zero simultaneously with resetting fuel consumed indicator pointer 17 by turning reset means 14 in FIG. 1 which is operatively connected to shaft 14A in FIG. 2. The transfer drive means on the total fuel consumed numeral wheels 15J, 15K and 15L are provided with one way clutch features to prevent turning when the trip fuel numeral wheels 15, 15A and 15B are reset to zero. The fuel consumed counting device 37 together with its associated numeral wheels illustrated in FIGS. 2 and 8 is of the electromechanical type.

Manifestly, the plurality of modified forms of the invention as depicted in FIGS. 1 through 11, and described thusly, is of such nature that both energy conservation as well as economics value will be derived from the use thereof and the invention is well adapted to serve as a useful adjunct to the vehicle instrument panel. The invention has novel arrangements and simplicity of construction, economy, ease of assembly and manipulation, and is readily adaptable to the numerous vehicle instrument arrangements. While I have illustrated and described construction in which my invention may be embodied, it is to be understood that these constructions have been selected merely for the purpose of illustration and that the various changes in size, shape and arrangement of the elements may be made without departing from the spirit of the invention or the scope of the subjoined claims.

Figure 11:
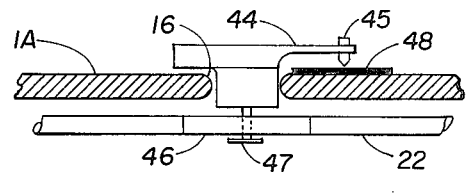
FIG. 11 is a partial sectional view looking in the same direction of arrows 11—11 in FIG. 1 illustrating another modified arrangement whereby the fuel economy performance is recorded onto a recording chart.

The fuel consumed counter numeral wheels 15, 15A, 15B and measuring device 26 are reset by reset means 13 shown in FIG. 2 or reset means 14 shown in FIG. 5. Depending upon the particular embodiment of this invention the fuel consumed recorder counter 15, 15A and 15B may also be provided with a total fuel consumed recorder counter comprised of numeral wheels 15H through 15L as illustrated in FIGS. 7 and 8. Referring to FIG. 2, and with specific regard to the integrated instrument cluster arrangement for the energy conservation indicating device, observe that the conventional fuel gauge indicating pointer has an arcuate translating path 31 with fuel tank empty and full indicating positions being generally at locations 32 and 33. When the fuel gauge indicator arm is pivotally mounted to the modified pivotally mounting means 34 as shown in FIG. 9, the fuel gauge has been uniquely integrated into the instrument cluster through alignment member guides 27 and 28. Thus in the present invention the energy conservation indicating device provides a continuous visual indication of vehicle performance in units of distance traveled per unit of fuel consumed. FIG. 10 illustrates still another modified pivotal mounting means 41 with fuel gauge drive means 42 operably interengaged thereto by fuel gauge indicating guide elements 39 and 40. Referring to FIGS. 7 and 8 observe that a modified arrangement includes a fuel consumed totalizer counter comprised of numeral wheels 15H thru 15L mounted on shaft 15H1. Furthermore, the alignment member guide elements 27 and 28 may be optionally pivotally connected to pivotally mounting means 29, as shown in FIG. 2, and the fuel consumed counter shaft 15C can be operatively connected to the conventional fuel gauge input signal by fuel counter drive means 37 which is illustatively shown in FIGS. 2 and 8. Referring to FIG. 11 a modified indexable recording pointer means 44 is shown operably interengaged with alignment member 22 by pivotal engagement shaft 46 and pivotal mounting means 47.

The features of my invention manifestly afford considerable latitude in the arrangement of components and selection of elements to automatically perform the logical operations on distance traveled input 21 and fuel consumed input 26 necessary to produce output answers in units of useful work performed per unit of fuel consumed, generally measured in miles per gallon and being indicated on scale 9. The calculation to be performed has previously been defined as DPG equals UWP divided by FC. Division can be a special case of multiplication since dividing UWP by FC is the same thing as multiplying UWP by the fraction 1/FC. That is, DPG equals UWP×1/FC. It is important to observe that by using voltages and currents in electrical networks together with operational amplifiers the same mathematical operations can be performed. In FIG. 2 distance traveled measuring device 21 would become a synchro transmitter generating a voltage proportional to the angular position of its input transmitting means 24. Furthermore, in integrating servo could be applied to the speedometer whereby the vehicle speed is an input to the integrating servo and the servo automatically computes the distance traveled as a time integral of the varying velocity. In FIGS. 5 and 8 fuel counter drive means 37 would become a servodivider with input voltage proportional to fuel consumed FC. A voltage proportional to the distance traveled UWP is applied to the wiper of the servodivider potentiometer 37 with the voltage UWP being divided by voltage FC as the wiper rotates and thereby computing DPG as the output voltage. Thus the physical qualities of distance traveled UWP and fuel consumed FC are represented by voltages appropriately scaled in proportion to the physical qualities and the electronic component characteristics. Therefore, with the physical variables, distance traveled UWP and fuel consumed FC, translated into corresponding scaled electrical variables it is entirely expedient to incorporate these electrical and electronic elements into an integrated solid state cluster generally occupying the space to the rear of aperture 6, aperture 16 and scale 8 shown in FIG. 1. Referring to FIGS. 1 and 2, distance indicator pointer 7 together with fuel consumed pointer 17 and indexable pointer means 12 would each be replaced with linear multicell electrically lighted elements receiving their input data from the integrated electrical network elements. Diagonal scale 8 can assume a vertical position generally centered between the distance traveled scale 6A and fuel consumed scale 18. The scales are appropriately calibrated such that normal satisfactory indication for vehicle fuel economy is generally centered on the scale 9. Fuel consumed scale 18 is calibrated such that one half tank indication is centered on the scale 18.

The selected modifications herein before described for the adaption to integrated electronics is set forth for the purpose of completing the disclosure. These electronic elements are generally of well known design in the electronic industry. Depending on the manufacturer and technique used, the concept of microminiaturization goes under many names such as integrated electronics, molecular electronics, micromodules, microcircuits, solid state electronics and others. Decisions regarding which technique is best suited for the present invention rest primarily upon economicies and reliability of performance. Wherever the term electrical or electronic is utilized in this application it is intended to convey the utilization of voltages, currents and resistances as fundamental properties having behavior characteristics mathematically defined by the well known Ohm's law and Kirchhoff's laws.

Therefore, according to the principles of the present invention, a unique vehicle energy conservation indicating device is provided whereby an integrated instrument cluster functions basically as a computing mechanism to indicate vehicle performance efficienty. While it has been shown and described as a plurality of modified arrangements in which the invention may be embodied, it is to be understood that these constructions have been selected for the purpose of illustration and that various changes in size, shape and arrangement of the parts may be made without departing from the spirit of the invention or the scope of the subjoined claims. While I have shown and described constructions in which my invention may be embodied, it is to be understood, therefore, that variations in the construction and arrangement may be made without departing from the spirit and scope of the invention as disclosed in the appended claims, in which it is intended to claim all novelty inherent in the invention as broadly as permissible, in view of prior art. This invention further resides in the construction, combination and arrangement of elements illustrated in the accompanying drawings, and while I have shown thereon preferred embodiments, it is to be understood that the same is susceptible to modifications and changes; and comprehends other details, arrangement of elements, features and construction without departing from the spirit of the invention, and that all matters herein set forth or shown in the accompanying drawings are to be interpreted as illustrative and not in the limiting sense. In view of this disclosure, variations and modifications will doubtlessly be generated by others skilled in the art to obtain all, or part of the benefits of this invention without duplicating the framework shown, and I therefore claim all such variations and modifications insofar as they fall within the reasonable spirit and/or scope of my proposals and claims.

Having thus described my invention, I claim as new and desire to secure by Letters Patent:

1. In combination a vehicle fuel economy indicating device for indicating miles per gallon or the equivalent, a drive means operated by a fuel consumed measuring means, a connection to an odometer drive means, the improvement comprising two oppositely disposed cooperable measuring means, an alignment member operatively connected to each of said cooperable measuring means, said operative connection providing pivotal mounting means between said cooperable measuring means and said alignment member, said operative connection providing independent linear translation movement to each of the oppositely disposed pivotal mounting means, calibrated graphic display scales embodied on the face surface of said device, said face surface juxtapositioned above and parallel to said cooperable measuring means, a first and second scale oppositely disposed and functionally located with respect to each said measuring means, said first scale calibrated for distance traveled and said second scale calibrated for fuel consumed, a third scale diagonally disposed between said first and second scales and calibrated to read average miles per gallon or the equivalent, observation means provided on said face surface adjacent to said scales thereby allowing simultaneous viewing of the registrations with said scales, the consequential operation of said oppositely disposed cooperable measuring means together with said alignment member all relative to said calibrated scales according to a mathematical relationship for vehicle fuel economy thereby indicating the miles per gallon at any related trip distance and fuel consumed setting.

2. The improved device of claim 1 wherein said alignment member is formed with oppositely disposed pivotal axes each respectively about the geometric centers of said opposite disposed pivotal mounting means, said alignment member communicating with said pivotal mounting means such that a straight line intersecting the oppositely disposed geometric centers uniquely establishes the location of a fuel economy indicating pointer means.

3. The improved device of claim 2 wherein said indicating pointer means is comprised of a contrasting color coded line disposed collinear with said straight line intersecting the said oppositely disposed geometric centers and embodied on the face surface of said alignment member.

4. The improved device of claim 1 wherein each said oppositely disposed pivotal mounting means includes an indicating pointer interengaged with each respective said pivotal mounting means through a respective aperture in said device face surface, said interengaging means disposed to cooperate with each said aperture and each said respective measuring means for controlling the translation movement of said pivotal mounting means.

5. The improved device of claim 1 in which said face surface is formed integral with a rear body surface thereby providing an integrated instrument cluster forming an integral part of both the vehicle instrument panel and the operator's visual field.

6. The improved device of claim 1 in which said scales are calibrated such that said alignment member positioned between any two calibrations on the said oppositely disposed distance traveled and fuel consumed scales uniquely determines a corresponding registration with the said diagonally disposed scale, said unique registration designated vehicle fuel economy generally in units of miles per gallon.

7. The improved device of claim 1 in which said alignment member is operatively connected to said oppositely disposed cooperable measuring means such that rotary motion of said measuring means is converted to linear translation of each said indicating pointer members.

8. The improved device of claim 1 where the mechanism is operatively driven through drive connection means comprising a first odometer drive means driving the respective indicating pointer member at a rate corresponding to the vehicle distance traveled, said driving means performed by continuous measurement of the physical quantity analogous to the numerical values for distance traveled, a second fuel consumed drive means driving the respective indicating pointer at a rate corresponding to the amount of fuel consumed from the zero set point, said fuel consumed driving means performed by continuous measurement of the physical quantity analogous to the numerical values for fuel consumed.

9. The improved device in accordance with claim 1 comprising an integrated instrument cluster having a first series of total distance traveled numeral wheels arranged in side by side alignment on a first numerical counter wheel shaft operably connected to said odometer drive means, a second series of trip distance traveled numeral wheels arranged in side by side alignment on a second numerical counter wheel shaft, a third series of intermediate elements being interposed between and located generally circumferentially opposite said related first and second series of numeral wheels on a third intermediate shaft, said intermediate elements related to each series of said numeral wheels and to said distance traveled measuring means and forming therewith cooperating elements operating to transmit rotary motion of said odometer drive means simultaneously to said numeral wheels and to said distance traveled measuring means, intermediate transmission means mounted in fixed relation to said third intermediate shaft and normally rotatably engaged with said distance traveled measuring means, said intermediate transmission means structurally disposed to form trip distance restoring means.

10. The improved device in accordance with claim 9 further comprising a first series of trip fuel consumed numeral wheels arranged in side by side alignment on a first numerical counter wheel shaft operably connected to said fuel consumed measuring means, a second series of intermediate elements being located generally circumferentially opposite said related first series of numeral wheels on a second intermediate shaft, said intermediate elements related to said numeral wheels and to said fuel consumed measuring means and forming therewith cooperating elements operating to transmit rotary motion of said fuel consumed drive means simultaneously to said numeral wheels and to said fuel consumed measuring means, intermediate transmission means mounted in fixed relation to said second intermediate shaft and normally rotatably engaged with said fuel consumed measuring means, said intermediate transmission means structurally disposed to form fuel consumed restoring means.

11. The improved device in accordance with claim 10 further comprising a second series of total fuel consumed numeral wheels arranged in side by side alignment on a second numerical counting wheel shaft, said intermediate elements being interposed between and located generally circumferentially opposite said related first and second series of numeral wheels on an intermediate shaft, said intermediate shaft operably engaged with intermediate transmission means, said intermediate transmission means disposed to form fuel consumed restoring means.

12. The improved device of claim 11 wherein said numeral wheels are arranged so that a predetermined sector of each wheel is disposed to communicate above said face surface, said face surface having apertures located and spaced around said numeral wheels.

13. The improved vehicle fuel economy indicating device of the class described in claim 1 comprising an integrated instrument cluster having a plurality of numeral counting wheels, means for continuous measurement of the physical quantities analogous to the numerical values for distance traveled and fuel consumed, intermediate elements mounted in operative relation to and normally meshing with said numeral wheels, said operative relation including intermediate transmission means operatively cooperating with respective said measuring means thereby causing an indication of numerical data analogous to distance traveled and fuel consumed to be registered and stored as a consequential result of operating said combination.

* * * * *